(12) United States Patent
Terpsma et al.

(10) Patent No.: US 9,242,519 B2
(45) Date of Patent: Jan. 26, 2016

(54) AUTOMATIC LOCK SYSTEM FOR VEHICLE HITCH ASSEMBLY

(71) Applicant: SAF-HOLLAND, Inc., Holland, MI (US)

(72) Inventors: Eric M Terpsma, Holland, MI (US); Richard T. Polanic, Hudsonville, MI (US)

(73) Assignee: SAF-HOLLAND, Inc., Holland, MI (US)

( * ) Notice: Subject to any disclaimer, the term of this patent is extended or adjusted under 35 U.S.C. 154(b) by 0 days.

(21) Appl. No.: 14/381,833

(22) PCT Filed: Feb. 20, 2013

(86) PCT No.: PCT/US2013/026889
§ 371 (c)(1),
(2) Date: Aug. 28, 2014

(87) PCT Pub. No.: WO2013/141995
PCT Pub. Date: Sep. 26, 2013

(65) Prior Publication Data
US 2015/0054258 A1    Feb. 26, 2015

Related U.S. Application Data

(60) Provisional application No. 61/613,112, filed on Mar. 20, 2012.

(51) Int. Cl.
*B60D 1/02*    (2006.01)
*A01B 59/00*    (2006.01)
*B60D 1/28*    (2006.01)

(52) U.S. Cl.
CPC .............. *B60D 1/025* (2013.01); *A01B 59/002* (2013.01); *B60D 1/02* (2013.01); *B60D 1/28* (2013.01)

(58) Field of Classification Search
CPC .............. B60D 1/025; B60D 1/28; B60D 1/02
See application file for complete search history.

(56) References Cited

U.S. PATENT DOCUMENTS

| | | | | |
|---|---|---|---|---|
| 1,887,054 A | * | 11/1932 | Wood ........................ | B60D 1/02 280/515 |
| 2,478,736 A | * | 8/1949 | Balzen ...................... | B60D 1/02 280/477 |
| 2,525,471 A | * | 10/1950 | Balzer ....................... | B60D 1/02 213/189 |
| 3,046,037 A | * | 7/1962 | Cain ......................... | B60D 1/26 280/47.33 |

(Continued)

OTHER PUBLICATIONS

Aero Specialties; Aero 1.5-Inch Tow E-Hitch, Single Level; Product Page.

(Continued)

*Primary Examiner* — Kevin Hurley
*Assistant Examiner* — Gabriela C Craciun
(74) *Attorney, Agent, or Firm* — Price Heneveld LLP

(57) ABSTRACT

A hitch coupler, comprising a frame is disclosed, wherein the frame includes a plurality of vertically spaced apart plates having apertures disposed there through. A vertically extending clevis pin is adapted to slide within the apertures of the vertically spaced apart plates between an extended position and a retracted position. The pin further includes a pin housing having a guide slot, wherein the guide slot has an offset portion used to lock the pin in either the extended position or the retracted position. Further, the pin houses an internal spring having a torsional bias that urges the pin to a locked position in either the extended or retracted position.

20 Claims, 10 Drawing Sheets

(56) References Cited

U.S. PATENT DOCUMENTS

| | | | | | |
|---|---|---|---|---|---|
| 3,146,003 | A | * | 8/1964 | De Ronde | B60D 1/02 280/515 |
| 3,190,677 | A | * | 6/1965 | Robbins | B60D 1/02 280/515 |
| 3,542,398 | A | * | 11/1970 | Melroe | B60D 1/38 280/477 |
| 4,579,364 | A | * | 4/1986 | Kranz | B60D 1/28 280/507 |
| 4,783,094 | A | * | 11/1988 | Sands | B60D 1/28 172/677 |
| 5,322,313 | A | * | 6/1994 | Schroeder | B60D 1/07 280/416.1 |
| 5,769,559 | A | * | 6/1998 | Olson | B60D 1/02 280/509 |
| 7,398,987 | B2 | * | 7/2008 | Roe | B60D 1/28 280/515 |
| 8,336,902 | B2 | * | 12/2012 | Terpsma | B60D 1/02 280/515 |
| 8,708,362 | B2 | * | 4/2014 | Terpsma | B60D 1/025 280/515 |
| 2012/0003036 | A1 | * | 1/2012 | Terpsma | B60D 1/02 403/327 |
| 2013/0221635 | A1 | * | 8/2013 | Terpsma | B60D 1/025 280/515 |

OTHER PUBLICATIONS

Aero Specialties; Aero, 1.5-Inch E-Hitch With Spring-Loaded Hitch Pin, Single Level; Product Page.
Aero Specialties; Aero E-Hitch Weld Plate; Product Page.
Haniquip; Dolly E-Hitch; Product Page.

* cited by examiner

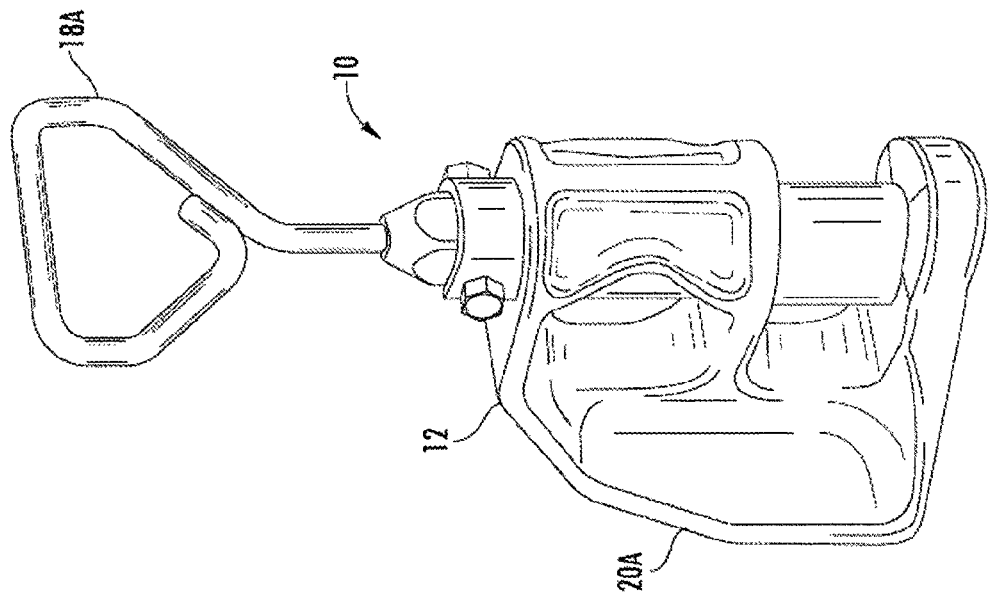
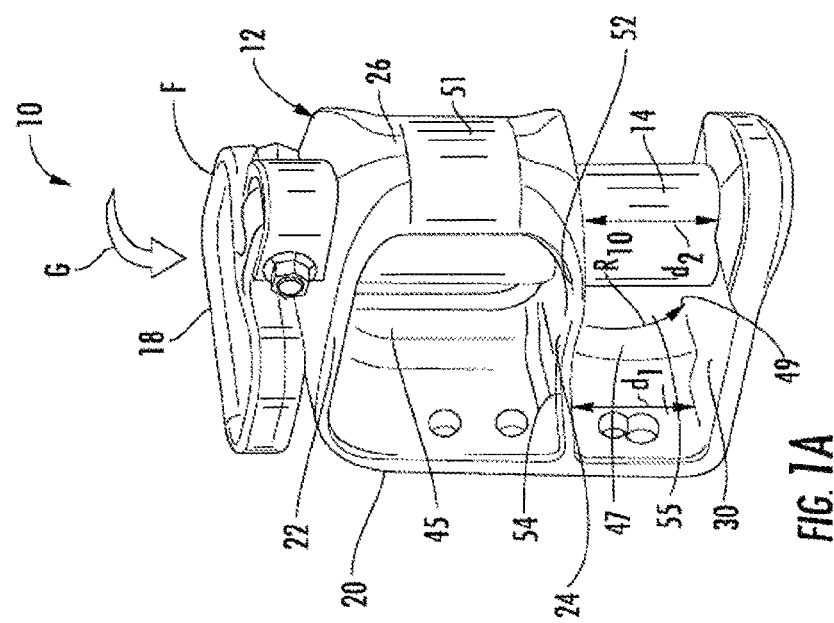

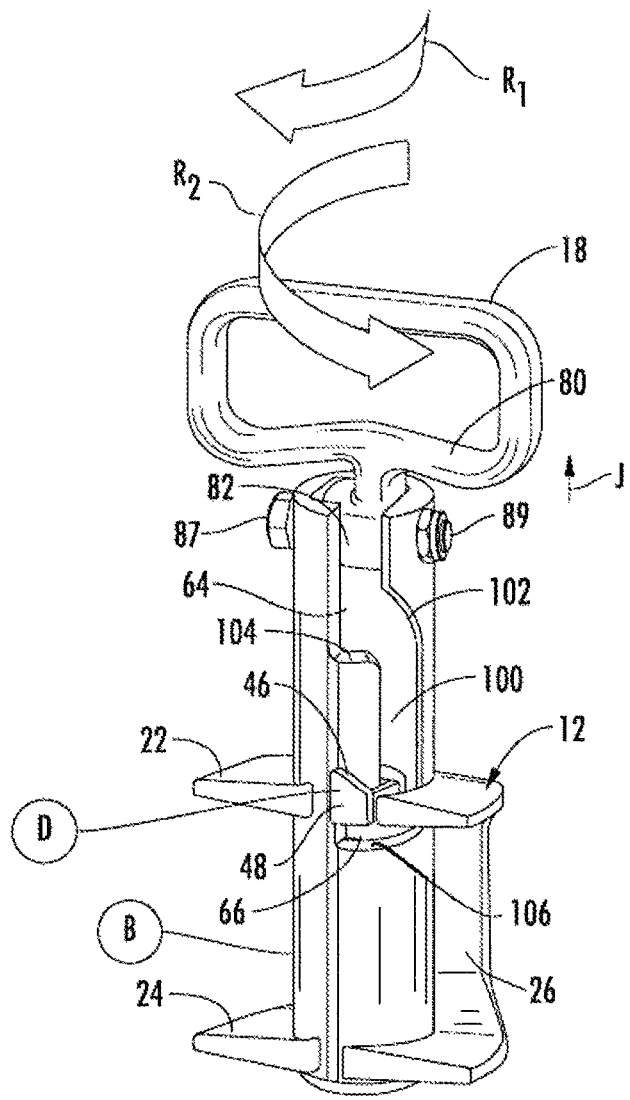
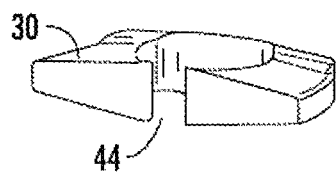
FIG. 2

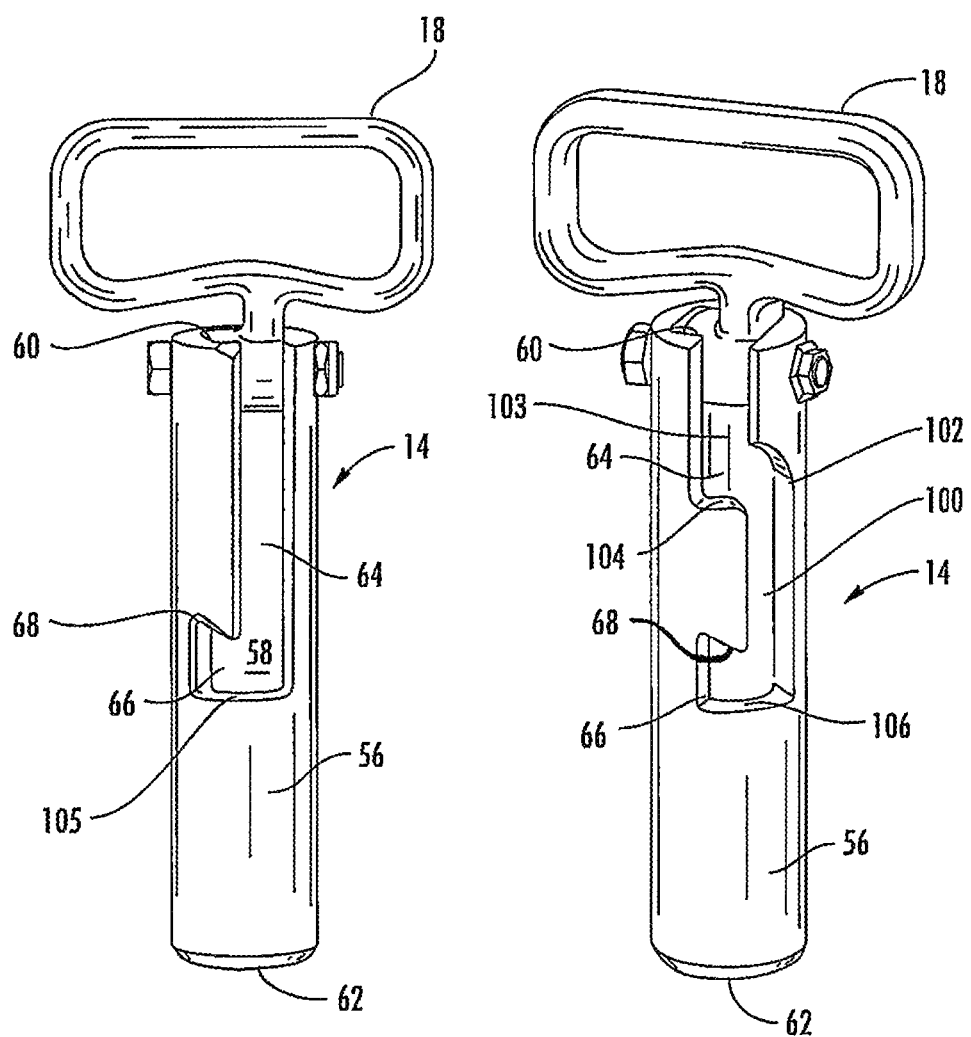

AUTOMATIC LOCK SYSTEM FOR VEHICLE HITCH ASSEMBLY

BACKGROUND OF THE INVENTION

The present invention generally relates to a trailer hitch coupler, and, more particularly, to a trailer hitch coupler that includes a vertically movable clevis pin for engaging a drawbar eye of a trailer or like apparatus to be towed, wherein a guide slot having an offset portion is disposed on a pin housing to lock the pin in either a retracted position or an extended position.

SUMMARY OF THE INVENTION

One aspect of the present invention includes a hitch coupler having a frame which includes a plurality of vertically spaced apart plates extending outwardly from the frame. A pin member is slidably received within apertures disposed on the vertically spaced apart plates, such that the pin member is moveable between an extended position and a retracted position. The pin member includes a pin housing having a generally cylindrical body with a hollow interior. A guide slot is vertically disposed on a portion of the pin housing and includes upper and lower ends with an offset portion disposed between the upper and lower ends. A guide member extends from the frame member and is slideably received within the guide slot of the pin housing to guide the pin member as the pin member moves between the extended position and the retracted position. A biasing mechanism is disposed within the hollow interior of the pin housing, and is operably coupled to a portion of the frame member at a first end and operably coupled to a lower portion of the pin housing at a second end. The biasing mechanism is adapted to bias the pin member towards the extended position, and is also adapted to impart a torsional force on the pin housing.

Another aspect of the present invention includes a hitch coupler having a frame member which includes a top plate, a bottom plate and a middle plate which is disposed between the top plate and the bottom plate. Each plate extends outwardly from the frame member and includes a pin receiving aperture. A pin member, having a pin housing and a handle portion, is slidably received within the pin receiving apertures of each plate, such that the pin member is slideable between an extended position and a retracted position. A guide slot is disposed along the pin housing and includes an upper end and a lower end. An offset portion is disposed between the upper end and the lower end of the guide slot. A guide member extends laterally from the top plate and is adapted to be slidably received within the guide slot of the pin housing. A biasing mechanism is disposed within the hollow interior of the pin housing, and is operably coupled to a portion of the guide member at a first end and operably coupled to a lower portion of the pin housing at a second end. The biasing mechanism is adapted to bias the pin member towards the extended position, and is also adapted to impart a torsional force on the pin housing.

Yet another aspect of the present invention includes a hitch coupler having a frame with a plurality of pin receiving apertures disposed thereon. A pin member, having a pin housing, is slidably received within the pin receiving apertures of the frame, such that the pin member is slideable between an extended position and a refracted position relative to the frame. A guide slot is disposed vertically along the pin housing an includes an upper end and a lower end with an offset portion disposed between the upper end and the lower end. A guide member extends from the frame member into a hollow interior of the pin housing, wherein a portion of the guide member is adapted to be slidably received within the guide slot of the pin housing. A biasing mechanism is disposed within the hollow interior of the pin housing. The biasing mechanism is operably coupled to a portion of the guide member at a first end and operably coupled to a lower portion of the pin housing at a second end. The biasing mechanism is adapted to bias the pin member towards the extended position, and is further adapted to bias the pin housing in a torsional manner.

These and other advantages of the present invention will be further understood and appreciated by those skilled in the art by reference to the following written specification and appended drawings.

BRIEF DESCRIPTION OF THE DRAWINGS

FIG. 1A is a front perspective view of the hitch coupler of FIG. 1;

FIG. 1B is a front perspective view of a hitch coupler of another embodiment of the present invention;

FIG. 2 is a cross-sectional front perspective view of the hitch coupler of FIG. 1, having the clevis pin in a retracted position;

FIG. 3 is a perspective view of a clevis pin having a guide slot;

FIG. 4 is a perspective view of a clevis pin having a guide slot including an offset portion;

DETAILED DESCRIPTION OF THE PREFERRED EMBODIMENTS

Figure 1:
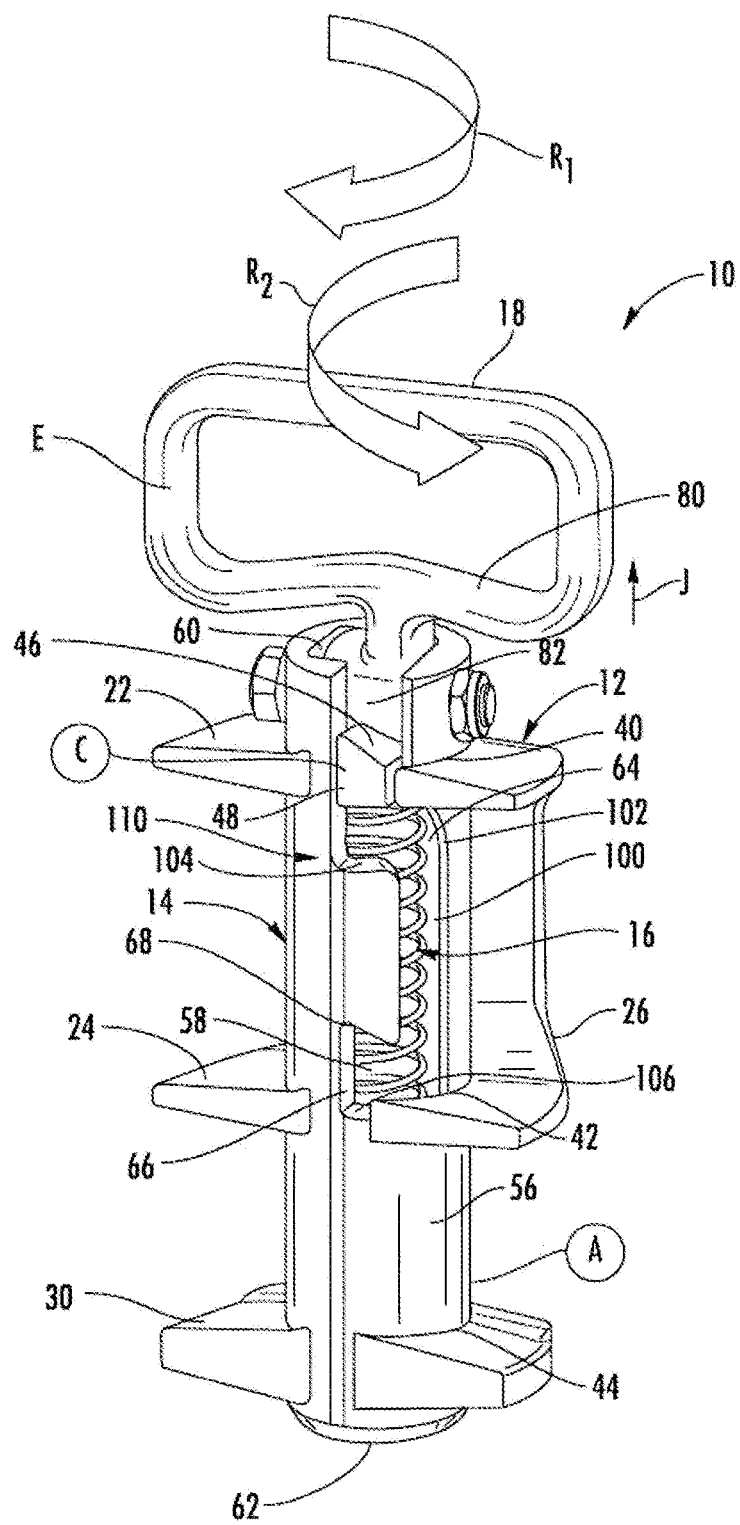
FIG. 1 is a cross-sectional front perspective view of a hitch coupler embodying the present invention, having a clevis pin in an extended position.

For purposes of description herein, the terms "upper," "lower," "right," "left," "rear," "front," "vertical," "horizontal," "top," "bottom," and derivatives thereof shall relate to the invention as shown in FIG. 1. However, it is to be understood that the invention may assume various alternative orientations, except where expressly specified to the contrary. It is also to be understood that the specific devices and processes illustrated in the attached drawings and described in the following specification are exemplary embodiments of the inventive concepts defined in the appended claim. Hence, specific dimensions, proportions, and other physical characteristics relating to the embodiment disclosed herein are not to be considered as limiting, unless the claim expressly states otherwise.

Referring now to FIG. 1, the reference numeral 10 generally designates a hitch coupler embodying the present invention. In the illustrated example, the hitch coupler 10 includes a frame 12, a vertically moving clevis pin 14 movable between extended and retracted positions, a spring member 16 biasing the pin 14 to the extended position within the frame 12, a handle member 18 provided so as to allow an operator to move the pin 14 within the frame 12 between the extended position A (FIG. 1) and the retracted position B (FIG. 2), and a lock mechanism 110 adapted to lock the pin 14 either in the extended position A or the retracted position B, as further described below.

Referring now to FIGS. 1 and 1A, the frame 12 includes a back plate 20, a top plate 22 integrally connected to and extending from an upper portion of the back plate 20, a middle plate 24 integrally connected to and extending from the back plate 20 at a position that is spaced below the top plate 22, and a front plate 26 integrally connected to and extending between distal ends of the top plate 22 and the middle plate 24. The frame 12 further comprises a bottom plate 30 integrally connected to and extending from a lower portion of the back plate 20 at a position spaced below the middle plate 24, such that the middle plate 24 is disposed at an intermediate location between the top plate 22 and the bottom plate 30.

Figure 2A:
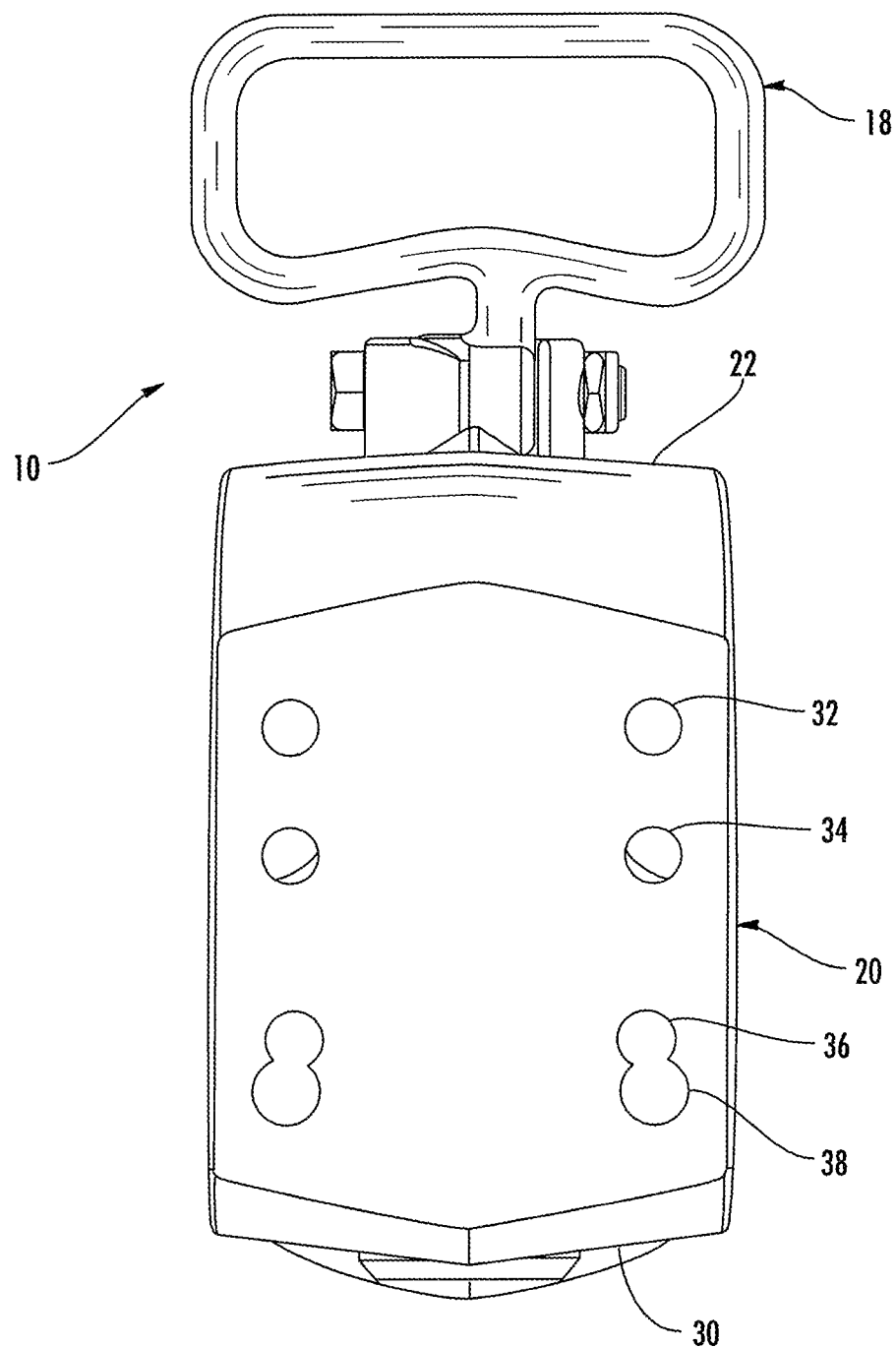
FIG. 2A is a rear elevational view of the hitch coupler of FIG. 1.

As best illustrated in FIG. 2A, the back plate 20 includes a plurality of apertures adapted to receive mechanical mounting hardware therein, such as bolts or other like fasteners, for securing the overall hitch coupler 10 to an associated towing vehicle. The apertures include a first pair of apertures 32 extending through the back plate 20 and each having a first diameter, a second pair of apertures 34 extending through the back plate 20 and each having a second diameter that is substantially similar to the first diameter, the second pair of apertures 34 being spaced below and located inwardly of the first pair of apertures 32, a third pair of apertures 36 extending through the back plate 20 and each having a third diameter that is substantially similar to the first diameter, the third pair of apertures 36 being spaced below the second pair of apertures 34 and located inwardly of the first pair of apertures 32, and a fourth pair of apertures 38 extending through the back plate 20 and each having a fourth diameter that is larger than the first diameter, the fourth pair of apertures 38 overlapping the third pair of apertures 36 and aligned with the first pair of apertures 32. The present inventive bolt pattern creates a universal hitch arrangement allowing the hitch coupler 10 to be utilized with vehicles or other hitches patterned for PH30 or E-hitch type assemblies and other mounting patterns known in the art.

Figure 6:
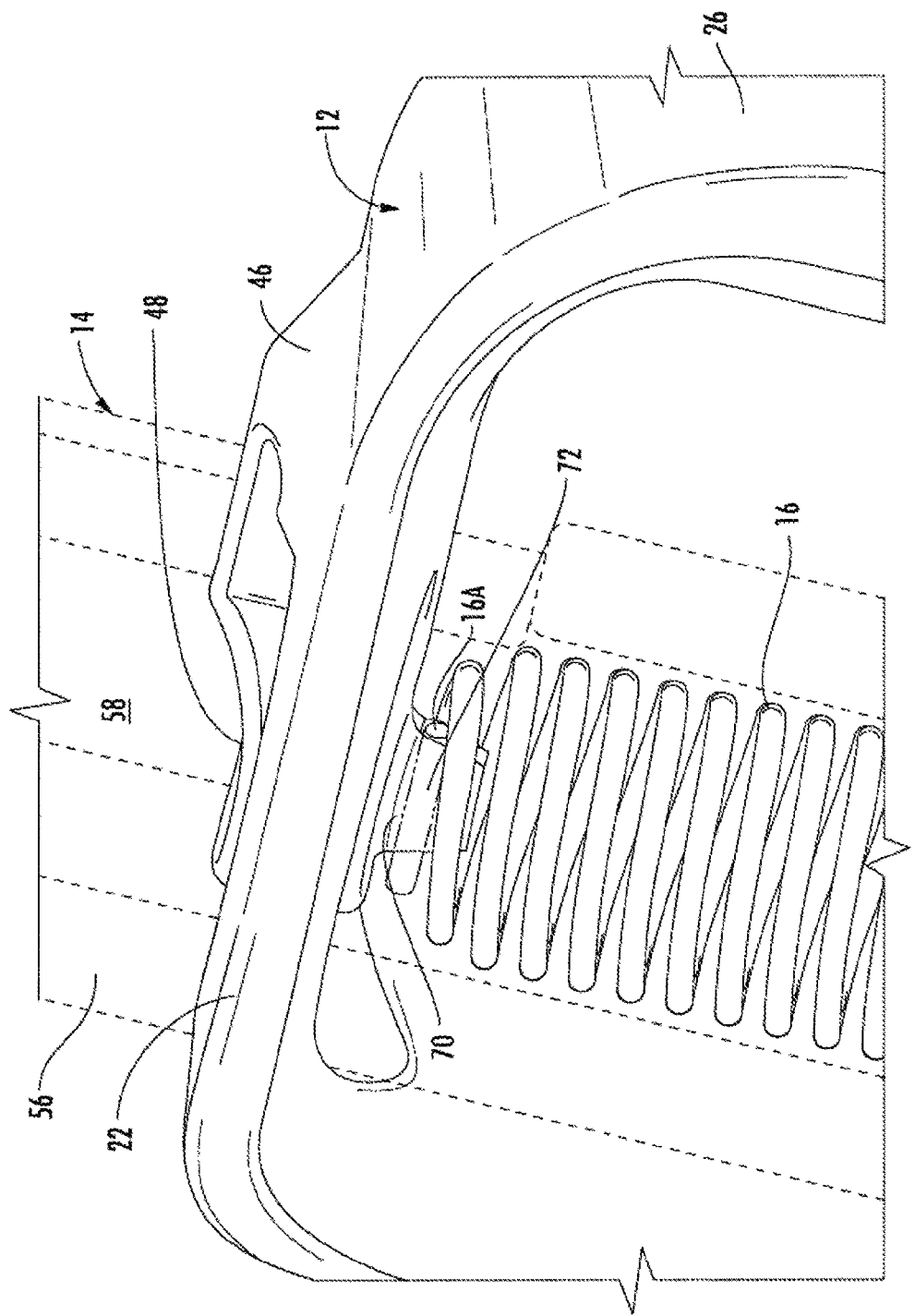
FIG. 6 is a fragmentary cross-sectional perspective view of the hitch coupler of FIG. 1.

Referring again to FIG. 1, each plate 22, 24 and 30 includes an aperture extending there through, such that the top plate 22 includes an aperture 40, the middle plate 24 includes an aperture 42, and the bottom plate 30 includes an aperture 44 each adapted to align in assembly to slidably receive the clevis pin 14. The top plate 22 includes a prismatic protrusion 46 (FIG. 6) extending upwardly therefrom, and a guide member 48 extending from the protrusion 46 into the aperture 40 disposed on the top plate 22. The protrusion 46 is adapted to secure the pin 14 in the retracted position B (FIG. 2), while the guide member 48 is adapted to guide the pin 14 as the pin 14 is moved between the retracted position B and the extended position A (FIG. 1), as further described below. The guide member 48 and the protrusion 46 are integrally formed as shown in FIG. 6. As shown in FIG. 1A, the front plate 26 includes a rounded or arcuately-shaped outer surface 51 that extends outwardly from an outermost portion of the bottom plate 30, and is adapted to deflect the collision of a cooperating drawbar assembly, thereby protecting the pin 14, the spring 16, the handle member 18, and other components of the hitch coupler 10 from damage.

Referring again to FIG. 1A, the middle plate 24 includes an upper portion 52 and a downwardly angled lower portion 54, such that a distance $d_1$, as defined between the proximal ends of the middle plate 24 and the bottom plate 30, is less than a distance $d_2$, as defined between the distal ends of the middle plate 24 and the bottom plate 30, thereby forcing a coupled portion of a drawbar into a particular, more restricted location within a gap 55 created between the middle plate 24 and the bottom plate 30. This restricted movement of the drawbar with respect to the hitch coupler 10 provides increased control of the towed vehicle/trailer and reduces the wear of associated components. A structural reinforcement rib 45 extends forwardly from the back plate 20 and vertically between the top plate 22 and the middle plate 24. A second reinforcement rib 47 extends forwardly from the back plate 20 and vertically between the middle plate 24 and the bottom plate 30. A forwardly facing surface 49 is provided an arcuate shape having a radius $R_{10}$ substantially similar to the radius of a coupled portion of a trailer drawbar, thereby limiting movement between the hitch coupler 10 and the drawbar, also resulting in better control of the towed vehicle/trailer and less wear to associated components.

Figure 7:
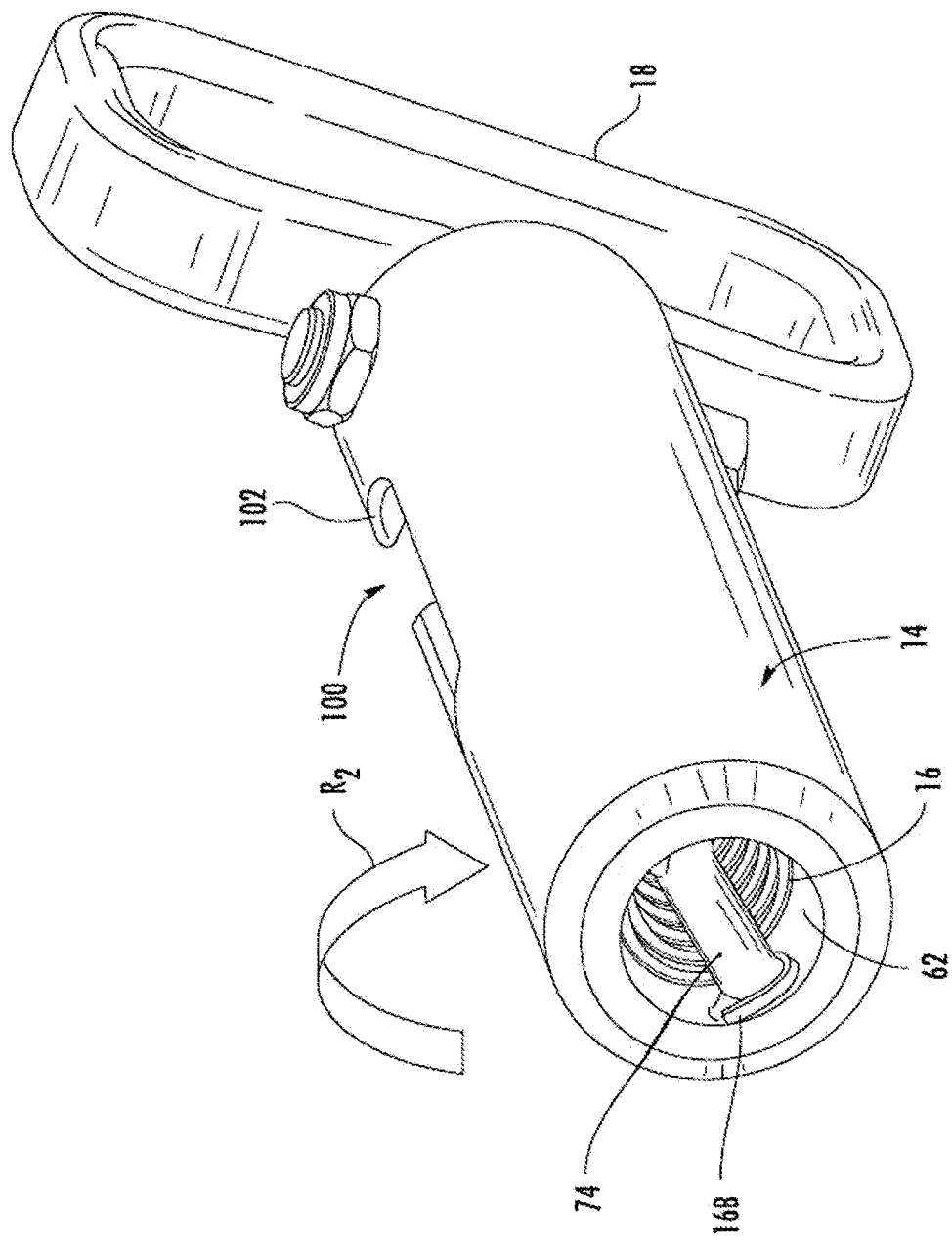
FIG. 7 is a bottom perspective view of a clevis pin.
Figure 7A:
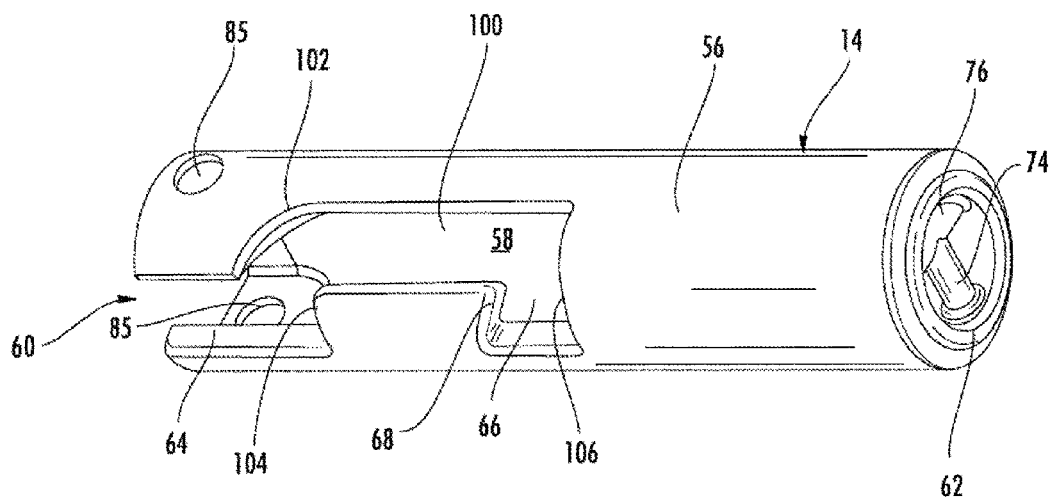
FIG. 7A is a perspective view of a clevis pin housing.

In the embodiment shown in FIG. 3, the clevis pin 14 includes a cylindrical housing 56 which defines a hollow interior space 58, which, in assembly, houses a biasing mechanism or spring 16 as shown in FIG. 1. The pin 14 includes an open top end 60 as best shown in FIGS. 1, 3, 4 and 7, and an open bottom end 62 as best shown in FIGS. 7 and 7A. With the open top end 60 and open bottom end 62, water and debris can drain from the hollow interior space 58 of the pin housing 56. The pin housing 56 further includes a longitudinally extending guide slot 64 extending downwardly from the open top end 60 of the pin housing 56 to a landing 105 disposed along a length of the pin housing 56. The landing 105, disposed at the lower end of the guide slot 64, terminates in a circumferentially and laterally extending relief slot 66 having an angled top surface 68 adapted to receive the protrusion 46 of the frame 12 therein when the clevis pin 14 is in the retracted position B as shown in FIG. 2.

In the embodiment shown in FIG. 4, the pin 14 includes a cylindrical housing 56 having a longitudinal extending guide slot 64, wherein the guide slot 64 further comprises an offset portion 100 which has a curved portion 102 and includes first and second landings 104, 106. Thus, as the clevis pin 14 moves vertically from an extended position A to a retracted position B, as shown in FIGS. 1 and 2, the guide member 48 guides the movement of the pin 14 as defined by the contours of the guide slot 64 from a first position C, as shown in FIG. 1, to a second position D, as shown in FIG. 2. As shown in FIG. 1, the clevis pin 14 is in the extended position A which is the necessary position for the clevis pin 14 to engage the hitch coupler 10 to the draw bar or eyelet of a trailer or other like assembly. The guide member 48 is in position C where the guide member 48 is disposed in an upper portion or upper end 103 of guide slot 64, as shown in FIG. 4, disposed above landing 104.

When moving the clevis pin 14 from the extended position A to the retracted position B, the operator will engage the handle 18 at a loop-shaped grasping portion 80. Grasping handle 18, the operator will move the pin 14 vertically by applying an upward force, indicated by arrow J in FIG. 1, thereby overcoming a downwardly directed biasing force exerted by the spring member 16 on the pin 14. Pin 14 is guided upward to the retracted position B by guide member 48 slideably guiding within the guide slot 64 of the pin housing 56. As guide member 48 travels through the guide slot 64, the guide member 48 will first approach landing 104 of guide slot 64 where the operator will then rotate the handle in a direction as indicated by arrow $R_1$ to move the guide member 48 into the offset portion 100 of the guide slot 64. Upon further imparting an upward force in the direction of arrow J on the handle 18, the operator will then vertically pull the pin 14 upward, such that the guide member 48 now approaches second landing 106 as the pin 14 moves to the retracted position B. Once the guide member 48 is in a position adjacent landing 106, the pin 14 is rotated in a direction $R_2$ for securing the pin 14 in the circumferential extending relief slot 66, where the pin 14 is then released such that the downward biasing force provided by spring member 16 will vertically engage the guide member 48 into the angled surface 68 of the relief slot 66 to secure the pin in the retracted position B, as shown in FIG. 2.

The engagement of the angled surface 68 with the prismatic protrusion 46 of the guide member 48 holds the pin 14 in the retracted position B, thereby allowing an operator to position a drawbar within the gap 55 of the frame 12 without having to physically hold the pin 14 in the retracted position B. This positive engagement and retention in the retracted position B further prevents the pin 14 from being bumped or accidentally jarred into movement towards the extended position A by requiring the operator to again exert an upward force J to the pin 14 via the handle 18, apply a rotational force $R_1$ to the pin 14 to align the guide member 48 with the offset portion 100 of the guide slot 64, and again lighten the upward force J to allow the spring 16 to bias the pin 14 downward into the extended position A. It is noted that the protrusion 46 may have other cross-sectional configurations that also allow for positive engagement of the clevis pin 14 in the retracted position B as discussed above.

Figure 5:
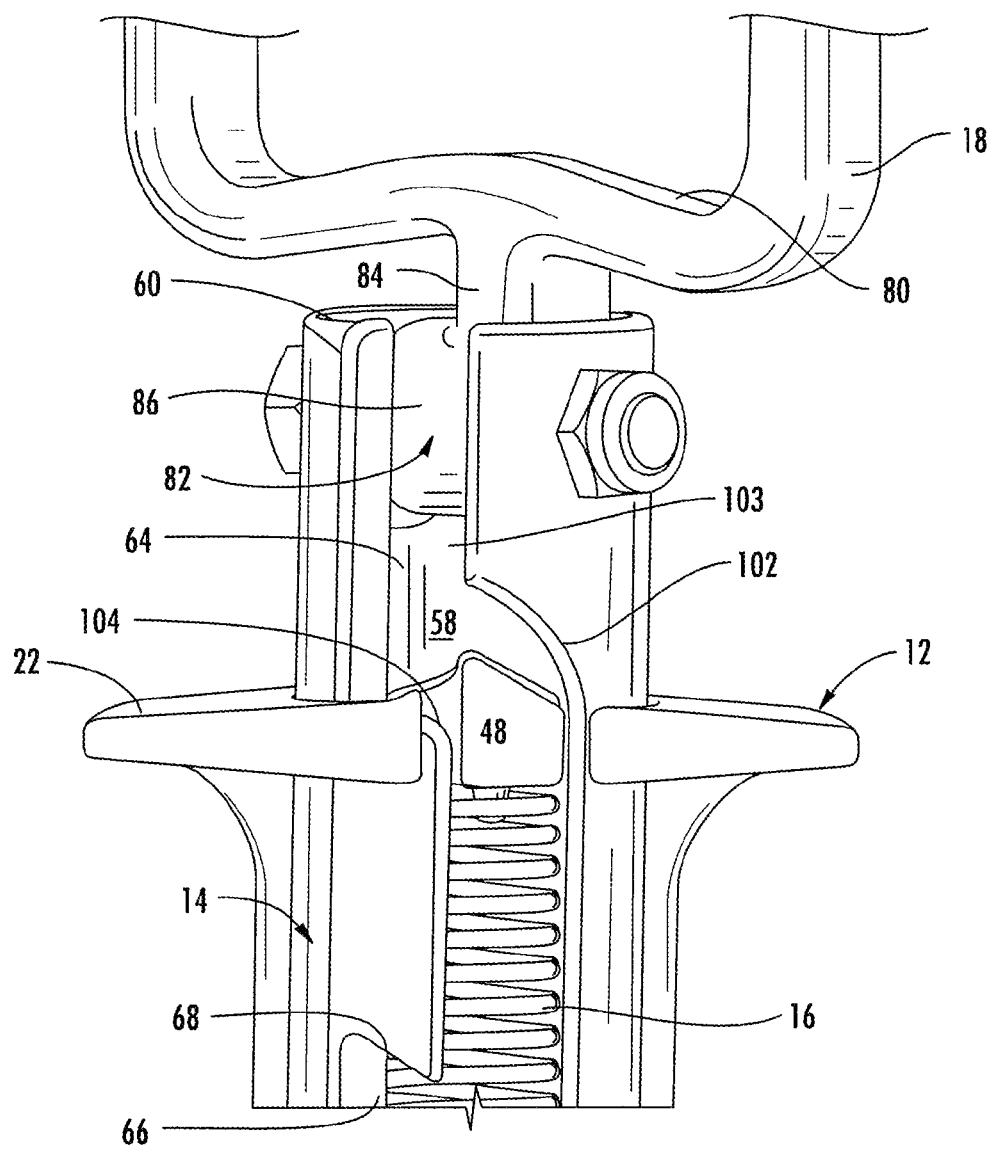
FIG. 5 is a fragmentary cross-sectional perspective view of the hitch coupler of FIG. 1.

To return the pin 14 to the extended position A, as shown in FIG. 1, the handle 18 is lifted upward, as indicated by arrow J, and rotated by applying a rotational force $R_1$ to release the pin 14 from the guide member 48. The biasing spring member 16 will then bias the pin 14 downward to the extended position A once the guide member 48 is aligned with the offset portion 100 of the guide slot 64. As the pin 14 moves downward, the guide member 48 approaches the initial curved portion 102 of the offset portion 100 as shown in FIG. 5. The curved portion 102 of the offset portion 100 urges the guide member 48 toward landing 104, such that the guide member 48 can ultimately rest in the upper portion 103 of the guide slot 64 adjacent an attachment portion 82 of the handle 18. The guide member 48 is further urged toward landing 104 by a torsional force imparted by the spring member 16, which acts on the pin 14 to rotationally urge the pin into a position where the guide member 48 of frame 12 is in one of the locked positions C, D, as shown in FIGS. 1 and 2. Thus, the spring member 16 is a spiral torsion spring that not only urges the clevis pin 14 to towards the extended position A, but also urges the clevis pin 14 in a torsional manner as indicated by arrow $R_2$ as shown in FIG. 1.

Figure 8:
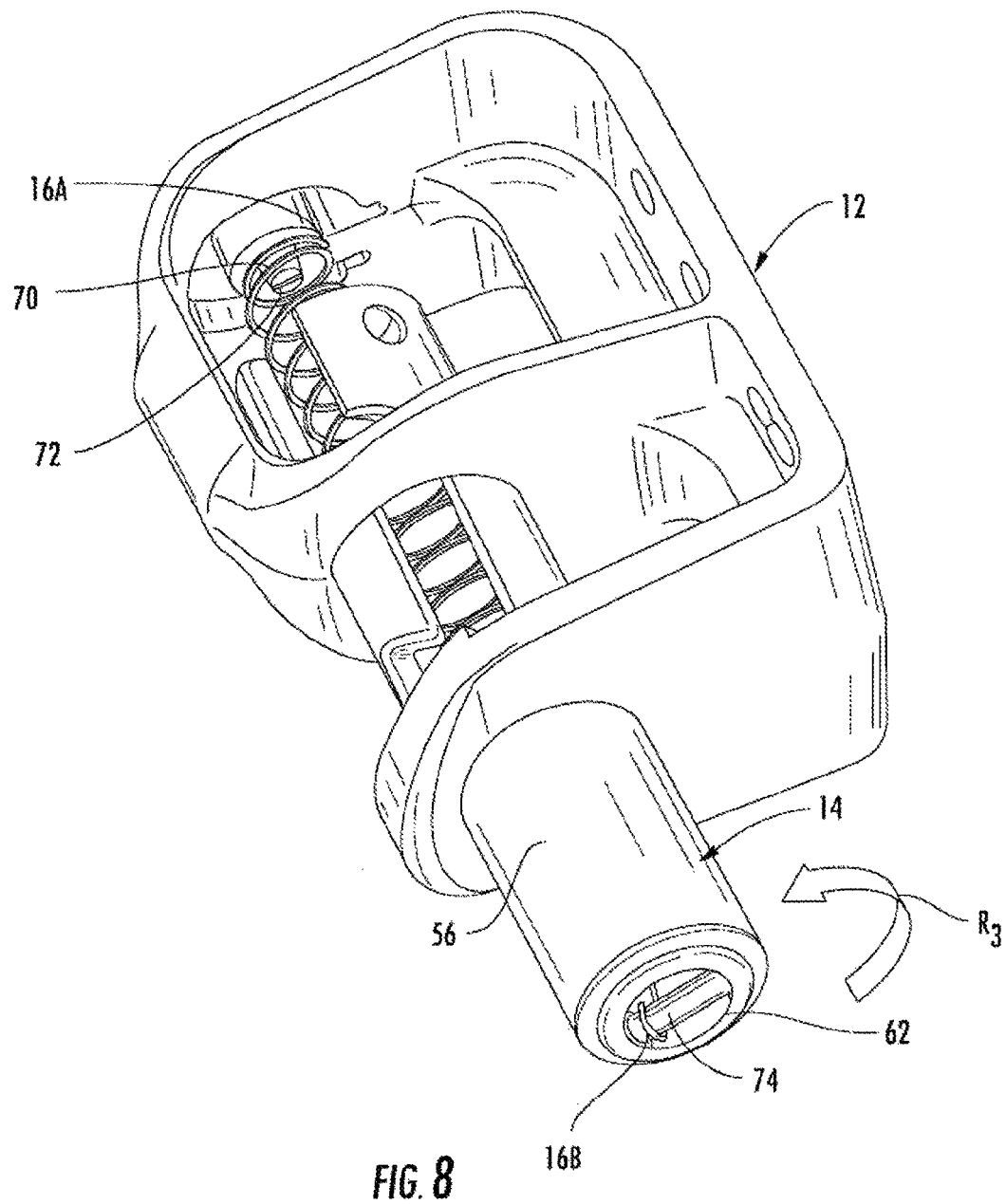
FIG. 8 is a bottom perspective view of a hitch coupler having an unattached clevis pin.

The torsional force, as indicated by arrow $R_2$ in FIG. 1, is created within the spring member 16 by first locking an upper end 16a of the spring member 16 into a portion of the frame 12. Specifically, as shown in FIG. 6, an upper boss 70 is disposed on a lower portion of guide member 48. The upper boss 70 remains within the hollow interior 58 of the pin housing 56 in assembly. The upper boss 70 comprises a slot 72 which is used to engage the upper end 16a of the spring member 16. It is contemplated that the upper end 16a of the spring member 16 can couple to the upper boss 70 in a variety of ways, which will be appreciated by those skilled in the art. The spring member 16 further comprises a lower end 16b, which, as shown in FIG. 7, attaches to a cross bar 74 disposed adjacent to the open bottom end 62 of the pin 14. Further, as shown in FIG. 7A, the open bottom end 62 of the pin 14 may comprise a crossing configuration having cross members 74 and 76 which form a generally T-shaped configuration for better securing of a hook-shaped lower spring end 16b near the lower open bottom end 62 of the pin 14. Once the upper end 16a and the lower end 16b of the spring member 16 are secured in place, the pin housing 56 is rotated one full turn in a counterclockwise direction as indicated by arrow $R_3$ (FIG. 8). The rotation of the pin housing 56 in a direction as indicated by $R_3$ creates the torsional force $R_2$, which biases the pin 14 into a locked engagement with guide member 48 of frame 12, as shown in FIGS. 1 and 2. Once the pin housing 56 has been rotated to impart the torsional force on the pin 14, the pin 14 can be fully assembled as further described below to retain the torsional force within the spring member.

As noted above, the handle member 18 (FIG. 5) includes a loop-shaped grasping portion 80 and an attachment portion 82 integrally formed with and extending outwardly from the grasping portion 80. The attachment portion 82 includes a narrowed neck portion 84 and an enlarged base portion 86 that is received into the open end 60 of the pin housing 56 of the pin 14 and pivotally secured thereto by a bolt 87 and nut 89 (FIG. 2) combination extending through a pair of apertures 85 (FIG. 7A) disposed on an upper portion of the pin housing 56. The base 86 may include a stop member extending asymmetrically from the neck 84. In assembly, the handle 18 may be assembled with the pin 14 in a first configuration, wherein the stop member of the handle 18 is aligned with the guide slot 64 of the housing 56 of the pin 14, thereby providing clearance for the stop member and allowing the handle 18 to be rotated from an in-use position E, as shown in FIG. 1, to a storage position F, as shown in FIG. 1A, wherein the neck portion 84 is engaged with the upper portion 103 of the guide slot 64 of the pin housing 56. Rotational movement of the handle 18 is indicated by arrow G as shown in FIG. 1A. With the handle portion 18 in place on the pin housing 56, the torsional force disposed within the spring member 16 is retained therein as the housing 56 cannot rotate to release the torsional force.

With the torsional force $R_2$ incorporated into the spring member 16, the axial stiffness and torsional stiffness of the spring are changed. As the torsion or twist in the spring member 16 is increased, the compression rate on the spring member 16 also increases due to the twist in the direction $R_2$ being in the same direction as the spring coils. Further, imparting the torsional force $R_2$ into the spring member 16 makes the outer diameter the spring member 16 smaller.

As shown in FIG. 1, the spring member 16 is an axial compression spring housed within the hollow interior 58 of the pin housing 56. The pin 14, as shown in FIG. 1, is being torsionally held in a locked position with guide member 48 of frame 12 being securely disposed within the upper portion 103 of the guide slot 64. If an operator were to grasp handle 18 and lift pin 14 in a vertical direction J without rotating the handle 18, guide member 48 would abut landing 104, thereby keeping the pin 14 fully engaged with a draw bar that could be disposed between middle plate 24 and lower plate 30. Thus, when the pin 14 is raised without rotation, from the extended position A, the lower portion or open bottom end 62 of the pin 14 will not clear aperture 44 of the bottom plate 30 of the frame 12, as the guide member 48 of the frame 12 will abut landing 104 of the guide slot 64 to insure that the pin 14 does not disengage from bottom plate 30. When the handle 18 is rotated such that the pin 14 rotates in a direction as indicated by the arrow $R_1$, the operator is turning the pin 14 against the torsional twist $R_2$ to unlock the pin 14 from both the upper or lower locked positions C and D.

It is further contemplated that the pin housing 56 can be rotated more than one full turn in a counterclockwise direction as indicated by arrow $R_3$ in FIG. 8 to thereby increase the torsional twist bias $R_2$ disposed within the spring 16 in assembly. Also, it is contemplated that any number of handles can be used with the hitch coupler 10, such as handle 18a shown in FIG. 1B, wherein the hitch coupler 10 also includes an enlarged back plate 20a for accommodating different mounting patterns as found in a vehicle to which the hitch coupler 10 will be mounted.

The torsional force imparted on the pin housing 56 by the biasing spring 16 in a direction as indicated by arrow $R_2$, as shown in FIG. 1, is adapted to rotate the pin housing 56 such that the guide member 48 aligns with the upper end 103 of the guide slot 64 when the pin member 14 is in the extended position A. When the pin member 14 is in the retracted position B, as shown in FIG. 2 the torsional force imparted on the pin housing 56 by the biasing mechanism 16 is adapted to rotate the pin housing 56 such that the guide member 48 aligns with the lower end 105 of the guide slot 64. Thus, the hitch coupler 10 of the present invention is adapted to automatically bias the clevis pin 14 to locked positions C and D shown in FIGS. 1 and 2 respectively.

It is to be understood that variations and modifications can be made on the aforementioned structure without departing from the concepts of the present invention, and further it is to be understood that such concepts are intended to be covered by the following claims unless these claims by their language expressly state otherwise. Specifically, the hitch coupler of the present invention can include more than one offset in the guide slot. Also, the guide slot can have an offset portion that offsets in a different lateral direction than the direction depicted in the accompanying figures. Further, the shape of the offset can be any geometrical configuration that provides the multiple locking features of the present invention.

The invention claimed is:

1. A hitch coupler, comprising:
   a frame member including a plurality of vertically spaced apart plates extending outwardly from the frame member;
   a pin member slidably received within apertures disposed on the vertically spaced apart plates, the pin member moveable between an extended position and a retracted position, wherein the pin member includes a pin housing having a hollow interior;
   a guide slot vertically disposed on the pin housing having upper and lower ends and an offset portion disposed therebetween;
   a guide member extending from the frame member, wherein the guide member is slideably received in the guide slot of the pin housing to guide the pin member between the extended position and the retracted position; and
   a biasing mechanism disposed within the hollow interior of the pin housing, the biasing mechanism operably coupled to a portion of the frame member at a first end and operably coupled to a lower portion of the pin housing at a second end, wherein the biasing mechanism is adapted to bias the pin member towards the extended position, and wherein the biasing mechanism is configured to impart torsional force on the pin housing.

2. The hitch coupler of claim 1, wherein torsional force imparted on the pin housing by the biasing mechanism is adapted to rotate the pin housing such that the guide member aligns with the upper end of the guide slot when the pin member is in the extended position, and further wherein the torsional force imparted on the pin housing by the biasing mechanism is adapted to rotate the pin housing such that the guide member aligns with the lower end of the guide slot when the pin member is in the retracted position.

3. The hitch coupler of claim 1, further comprising:
   a handle member having a connecting portion, the connecting portion coupled to an upper portion of the pin housing such that the connecting portion is partially disposed within the hollow interior of the pin housing, wherein the guide member abuts the connecting portion of the handle member to retain the pin member in the extended position.

4. The hitch coupler of any one of claim 3,
   wherein the handle member is pivotally coupled to the upper portion of the pin housing, and wherein the handle portion is configured to be engaged by a user to move the pin member between the extended and retracted positions.

5. The hitch coupler of claim 1, further comprising:
   a relief slot disposed at the lower end of the guide slot, wherein the relief slot is configured to engage a portion of the guide member when the pin member is in the retracted position to retain the pin member in the retracted position.

6. The hitch coupler of claim 1, wherein the biasing mechanism comprises a spiral torsion spring.

7. The hitch coupler of claim 6, further comprising:
   a first boss member disposed on an underside of the guide member, wherein the first end of the spiral torsion spring is coupled to the first boss member.

8. The hitch coupler of claim 7, further comprising:
   a second boss member disposed in a lower portion of the hollow interior of the pin housing, wherein the second end of the spiral torsion spring is coupled to the second boss member.

9. A hitch coupler, comprising:
   a frame member including a top plate, a bottom plate and a middle plate disposed between the top plate and the bottom plate, each plate extending outwardly from the frame member and each plate further including a pin receiving aperture disposed thereon;
   a pin member having a pin housing and a handle portion, the pin housing slidably received within the pin receiving apertures such that the pin member is slideable between an extended position and a retracted position;
   a guide slot disposed along the pin housing having an upper end and a lower end and an offset portion disposed between the upper end and the lower end;
   a guide member extending laterally from the top plate, wherein the guide member is configured to be slidably received within the guide slot of the pin housing; and
   a biasing mechanism disposed within a hollow interior of the pin housing, the biasing mechanism operably coupled to a portion of the guide member at a first end and operably coupled to a lower portion of the pin housing at a second end, wherein the biasing mechanism is adapted to bias the pin member towards the extended position, and wherein the biasing mechanism is configured to impart a torsional force on the pin housing.

10. The hitch coupler of claim 9, wherein the torsional force imparted on the pin housing by the biasing mechanism is adapted to rotate the pin housing such that the guide member aligns with the upper end of the guide slot when the pin member is in the extended position, and wherein the torsional force imparted on the pin housing by the biasing mechanism is adapted to rotate the pin housing such that the guide member aligns with the lower end of the guide slot when the pin member is in the retracted position.

11. The hitch coupler of claim 9, further comprising:
    a handle member pivotally coupled to an upper portion of the pin housing such that a portion of the handle member is disposed within the hollow interior of the pin housing and abuts the guide member when the pin member is in the extended position to retain the pin member in the extended position.

12. The hitch coupler of claim 9, wherein the lower end of the guide slot comprises a relief slot adapted to engage a portion of the guide member when the pin member is in the retracted position to retain the pin member in the retracted position.

13. The hitch coupler of claim 12, wherein the relief slot comprises an angled top surface.

14. The hitch coupler of claim 13, further comprising:
a protrusion disposed on the guide member having a mating angled surface relative to the angled top surface of the relief slot.

15. The hitch coupler of claim 9, wherein the biasing mechanism comprises a spiral torsion spring.

16. A hitch coupler, comprising:
a frame member having a plurality of pin receiving apertures disposed thereon;
a pin member having a pin housing slidably received within the pin receiving apertures such that the pin member is slideable between an extended position and a retracted position;
a guide slot disposed vertically along the pin housing having an upper end and a lower end and an offset portion disposed between the upper end and the lower end;
a guide member extending from the frame member into a hollow interior of the pin housing, wherein a portion of the guide member is configured to be slidably received within the guide slot of the pin housing; and
a biasing mechanism disposed within the hollow interior of the pin housing, the biasing mechanism operably coupled to a portion of the guide member at a first end and operably coupled to a lower portion of the pin housing at a second end, wherein the biasing mechanism is adapted to bias the pin member towards the extended position, and wherein the biasing mechanism is configured to impart a torsional force on the pin housing.

17. The hitch coupler of claim 16, wherein the torsional force imparted on the pin housing by the biasing mechanism is adapted to rotate the pin housing such that the guide member aligns with the upper end of the guide slot when the pin member is in the extended position, and wherein the torsional force imparted on the pin housing by the biasing mechanism is adapted to rotate the pin housing such that the guide member aligns with the lower end of the guide slot when the pin member is in the retracted position.

18. The hitch coupler of claim 16, further comprising:
a first boss member disposed on an underside of the guide member, wherein the first end of the biasing mechanism is coupled to the first boss member.

19. The hitch coupler of claim 18, further comprising:
a second boss member disposed in a lower portion of the hollow interior of the pin housing, wherein the second end of the biasing mechanism is coupled to the second boss member.

20. The hitch coupler of claim 19, wherein the second boss member comprises a cross-shaped configuration.

* * * * *

UNITED STATES PATENT AND TRADEMARK OFFICE
CERTIFICATE OF CORRECTION

PATENT NO. : 9,242,519 B2
APPLICATION NO. : 14/381833
DATED : January 26, 2016
INVENTOR(S) : Terpsma et al.

It is certified that error appears in the above-identified patent and that said Letters Patent is hereby corrected as shown below:

Specification

*Col. 1, lines 20-21
"moveable" should be — movable —

*Col. 1, line 27
"slideably" should be — slidably —

*Col. 1, line 44
"slideable" should be — slidable —

*Col. 1, line 62
"slideable" should be — slidable —

*Col. 1, line 63
"refracted" should be — retracted —

*Col. 1, line 65
"an" (1st occurrence) should be — and —

*Col. 2, line 55
"claim" should be — claims —

*Col. 2, line 58
"claim … states" should be — claims … state —

*Col. 4, line 59
"slideably" should be — slidably —

Signed and Sealed this
Twenty-sixth Day of April, 2016

Michelle K. Lee
*Director of the United States Patent and Trademark Office*

*Col. 5, line 46
Delete "to"

*Col. 6, line 42
After "diameter" insert -- of --

Claims

*Col. 7, claim 1, line 40
"moveable" should be — movable —

*Col. 7, claim 1, line 47
"slideably" should be — slidably —

*Col. 7, claim 2, line 59
After "wherein" insert -- the --

*Col. 8, claim 4, line 9
Delete "any one of" AND delete the paragraph after "claim 3,"

*Col. 8, claim 9, line 40
"slideable" should be — slidable —

*Col. 9, claim 16, line 23
"slideable" should be — slidable —